J. B. MORRISON.
DRAFT-EQUALIZERS.
No. 179,485.   Patented July 4, 1876.
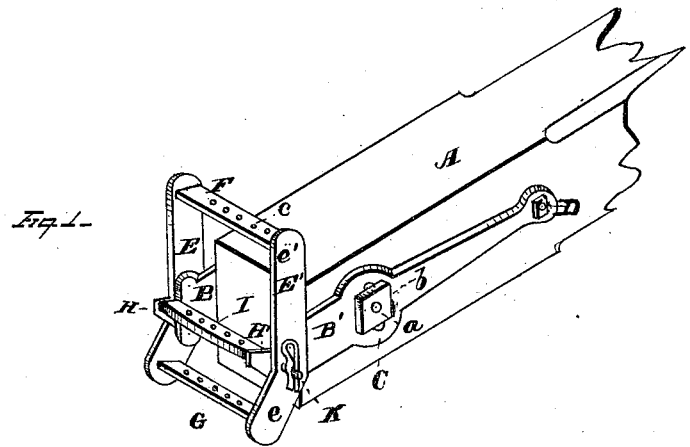
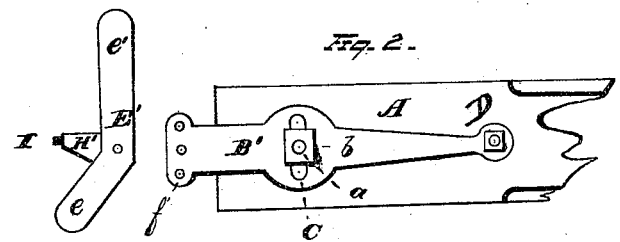
WITNESSES
Ed. F. Ittingham
A. W. Bright
INVENTOR
Joseph B. Morrison
B. W. A. Seymour
Attorney

UNITED STATES PATENT OFFICE.

JOSEPH B. MORRISON, OF FORT MADISON, IOWA.

IMPROVEMENT IN DRAFT-EQUALIZERS.

Specification forming part of Letters Patent No. 179,485, dated July 4, 1876; application filed May 20, 1876.

*To all whom it may concern:*

Be it known that I, J. B. MORRISON, of Fort Madison, in the county of Lee and State of Iowa, have invented certain new and useful Improvements in Draft-Equalizers; and I do hereby declare the following to be a full, clear, and exact description of the invention, such as will enable others skilled in the art to which it pertains to make and use it, reference being had to the accompanying drawings, which form part of this specification.

My invention relates to an improved draft-equalizer; and it consists in the combination of parts, which will more fully appear from the following description and claim.

In the accompanying drawings, Figure 1 represents a perspective view of my invention, and Fig. 2 shows the several parts of my device in detail.

A is the plow-beam, and B B' are clevis-plates, having their inner ends secured to the beam A by the single through-bolt D. The plates B B' are provided at or near their centers with straight or arc-shaped slots C, through which a bolt, a, is passed.

By unscrewing the nut b of bolt a the plates may be adjusted according to the depth of furrow desired, and the plates securely fastened in the desired position by screwing the nut b tightly against the clevis-plate.

E E' are the arms of the equalizer, and each of said arms is composed of the short arm e and long arm e'. The upper and long arms e' are secured to each other by a cross-bar, F, which is provided with holes c for the attachment of a single-tree. The lower or short arms e are connected by a cross-bar, G, which is also perforated to admit of the attachment of a double-tree.

H H' are ears or lugs, which are attached to or form a part of the arms E E', and to said ears the perforated cross-bar I is secured.

A locking bolt or pin, J, secures the arms E E' of the equalizer to the clevis-plates B B', the end of said locking-pin having a groove for the attachment of a linchpin, K. The outer ends of the clevis-plates B B' are provided with three holes, f, more or less, which constitute additional means of varying the vertical adjustment of the equalizer. The clevis-plates B B' are attached to the sides of the plow-beam, and the equalizer assumes a vertical position.

Two horses are attached to the lower and short arm of the equalizer by means of a double-tree. A single horse is attached to the upper or long arm of the equalizer by means of the single-tree, and as the single-tree is above the double-tree, the traces of the center horse will always work clear of the inner traces of the "near" and "off" horses.

If it is desired to work only a pair of horses, the double-tree is attached to the intermediate cross-bar I, when a direct draft is secured.

To change the land of the plow it is simply necessary to change the point of attachment of the double and single trees to the perforated cross-bars.

The depth of the plow can be varied either by varying the inclination of the clevis-plates or by attaching the equalizer to the same at different heights, as heretofore set forth.

I am aware that it is not new to construct a three-horse equalizer of a single lever having long and short arms, to which are respectively secured the single-tree and double-tree for the attachment of three horses, and hence I make no claim to such a construction.

Having fully described my invention, what I claim, and desire to secure by Letters Patent, is—

A three-horse draft-equalizer, consisting essentially of upright bars, adapted to be pivoted to the front end of a plow-beam, the said bars being connected by perforated cross-bars, whereby the land and depth of the plow may be regulated as desired, all constructed substantially as and for the purpose set forth.

In testimony that I claim the foregoing I have hereunto set my hand this 15th day of May, 1876.

J. B. MORRISON.

Witnesses:
  A. W. BRIGHT,
  THOS. B. HALL.